US011520307B2

(12) United States Patent
Kurokami et al.

(10) Patent No.: US 11,520,307 B2
(45) Date of Patent: Dec. 6, 2022

(54) TOOL MANAGEMENT SYSTEM OF MACHINE TOOL

(71) Applicant: FANUC CORPORATION, Yamanashi (JP)

(72) Inventors: Noboru Kurokami, Yamanashi (JP); Shinichi Ogawa, Yamanashi (JP); Kazunori Miyashita, Yamanashi (JP); Daisuke Mochizuki, Yamanashi (JP); Hidefumi Kawano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/743,154

(22) Filed: Jan. 15, 2020

(65) Prior Publication Data
US 2020/0233396 A1      Jul. 23, 2020

(30) Foreign Application Priority Data

Jan. 22, 2019   (JP) .............................. JP2019-008438

(51) Int. Cl.
G05B 19/4065  (2006.01)
B23Q 11/00     (2006.01)
B23Q 17/09     (2006.01)

(52) U.S. Cl.
CPC .......... *G05B 19/4065* (2013.01); *B23Q 11/00* (2013.01); *B23Q 17/098* (2013.01);
(Continued)

(58) Field of Classification Search
None
See application file for complete search history.

(56) References Cited

U.S. PATENT DOCUMENTS 5,895,177 A * 4/1999 Iwai ................... B23Q 17/0961
                                                                 318/35
6,167,325 A * 12/2000 Kamiguchi ........ G05B 19/4103
                                                                 700/183
(Continued)

FOREIGN PATENT DOCUMENTS

CN    111451837 A    7/2020
JP    S57-003541 U   1/1982
(Continued)

OTHER PUBLICATIONS

CNC Cookbook, "G-Code and M-code Reference List for Milling", Available online Jun. 20, 2019, total 9 pages, downloaded from the internet https://www.cnccookbook.com/g-code-m-code-reference-list-cnc-mills/ (Year: 2019).

(Continued)

*Primary Examiner* — Umut Onat
(74) *Attorney, Agent, or Firm* — Studebaker & Brackett PC

(57) ABSTRACT

A tool management system of a machine tool includes: a detection unit to detect at least one of vibration, acoustic waves produced during operation of the machine tool, and current value of a server motor of a driving machine tool; a tool replacement determination unit that determines the necessity to replace the tool on the basis of information related to a detection value of at least one of the vibration, the acoustic waves, and the current value detected during operation of the machine tool; and a detection start/end command setting unit that adds commands for a detection start point and a detection end point of at least one of the vibration, the acoustic waves, and the current value of the servo motor to a machining program.

6 Claims, 2 Drawing Sheets

(52) U.S. Cl.
CPC ..... *B23Q 17/0961* (2013.01); *B23Q 17/0971* (2013.01); *G05B 2219/37032* (2013.01); *G05B 2219/37209* (2013.01); *G05B 2219/37337* (2013.01); *G05B 2219/37632* (2013.01)

(56) References Cited

U.S. PATENT DOCUMENTS

| | | | |
|---|---|---|---|
| 6,263,464 | B1 | 7/2001 | Iafrate et al. |
| 6,353,874 | B1 | 3/2002 | Morein |
| 6,937,942 | B2* | 8/2005 | Lee .................. B23Q 17/0961 702/34 |
| 7,925,017 | B2 | 4/2011 | Shirai et al. |
| 10,195,682 | B2* | 2/2019 | Fagan ................ G05B 19/4155 |
| 10,464,220 | B2 | 11/2019 | Tanaka |
| 10,493,576 | B2* | 12/2019 | Sonoda .................... B23Q 5/58 |
| 10,635,081 | B2* | 4/2020 | Nakahama ........... G06N 3/0454 |
| 10,747,197 | B2* | 8/2020 | Satou ................ B23Q 17/0995 |
| 2005/0256605 | A1 | 11/2005 | Maeda et al. |
| 2005/0289077 | A1 | 12/2005 | Yajima |
| 2010/0106215 | A1 | 4/2010 | Stubbs et al. |
| 2010/0257327 | A1 | 10/2010 | Kosugi |
| 2014/0257717 | A1* | 9/2014 | Kumazaki .......... B23Q 17/0961 702/35 |
| 2015/0051728 | A1 | 2/2015 | Kim et al. |
| 2015/0112475 | A1 | 4/2015 | Murakawa |
| 2016/0041070 | A1 | 2/2016 | Wascat et al. |
| 2016/0091398 | A1 | 3/2016 | Pluemer |
| 2016/0299488 | A1 | 10/2016 | Ogawa |
| 2016/0377506 | A1 | 12/2016 | Bizub |
| 2017/0185061 | A1 | 6/2017 | Otsuki |
| 2017/0249052 | A1 | 8/2017 | Nishi |
| 2017/0277174 | A1 | 9/2017 | Maeda |
| 2017/0357243 | A1 | 12/2017 | Takayama et al. |
| 2018/0018641 | A1* | 1/2018 | Jussel ................... G06F 11/008 |
| 2018/0043488 | A1* | 2/2018 | Sonoda ................ B23Q 17/007 |
| 2018/0164757 | A1 | 6/2018 | Matsushima et al. |
| 2018/0246494 | A1* | 8/2018 | Nakahama .............. G06F 15/76 |
| 2019/0171199 | A1 | 6/2019 | Unuma et al. |
| 2019/0294144 | A1* | 9/2019 | Takahara ........... G05B 23/0221 |
| 2020/0001420 | A1 | 1/2020 | Sarup et al. |
| 2020/0234253 | A1* | 7/2020 | Kurokami ............ G05B 19/406 |
| 2020/0272125 | A1* | 8/2020 | Okudera ................ G06N 20/00 |

FOREIGN PATENT DOCUMENTS

| | | |
|---|---|---|
| JP | S61-061742 A | 3/1986 |
| JP | S62-136344 A | 6/1987 |
| JP | H04-141342 A | 5/1992 |
| JP | H06-043920 A | 2/1994 |
| JP | H08-126940 A | 5/1996 |
| JP | H10-286743 A | 10/1998 |
| JP | H11-170142 A | 6/1999 |
| JP | H11-234433 A | 8/1999 |
| JP | 2004-042208 A | 2/2004 |
| JP | 2005-074545 A | 3/2005 |
| JP | 2005-199379 A | 7/2005 |
| JP | 2006-130604 A | 5/2006 |
| JP | 2007-272545 A | 10/2007 |
| JP | 2008-000828 A | 1/2008 |
| JP | 2011-118840 A | 6/2011 |
| JP | 2014-196987 A | 10/2014 |
| JP | 2017-170578 A | 9/2017 |
| JP | 2018103284 A | 7/2018 |
| JP | 2020-116667 A | 8/2020 |
| WO | 2008/142386 A1 | 11/2008 |
| WO | 2017/056264 A1 | 4/2017 |

OTHER PUBLICATIONS

American Micro Industries, "The Differences Between G Code and M Code", Jun. 2019, total 7 pages, downloaded from the internet https://www.americanmicroinc.com/difference-g-code-m-code.html (Year: 2019).

Green Tool Systems, "List of M-codes", 2018, Dec. 8, 2018, total 7 pages, downloaded from the internet https://web.archive.org/web/20181208122013/http://greenetool.com:80/troubleshooting-carbide-cutting-tools/list-of-m-codes/ (Year: 2018).

Downey et al; "Real time monitoring of the CNC process in a production environment—the data collection & analysis phase"; Procedia CIRP 41, pp. 920-926, 2015, ELSEVIER, downloaded from the internet https://www.sciencedirect.com/science/article/pii/S2212827115010872 (Year: 2015).

An Office Action mailed by the United States Patent and Trademark Office dated Feb. 19, 2021, which corresponds to U.S. Appl. No. 16/743,154 and is related to U.S. Appl. No. 16/743,154.

An Office Action mailed by the United States Patent and Trademark Office dated Jul. 2, 2020, which corresponds to U.S. Appl. No. 16/743,154 and is related to U.S. Appl. No. 16/743,154.

An Office Action; "Notice of Reasons for Refusal," mailed by the Japanese Patent Office dated Mar. 2, 2021, which corresponds to Japanese Patent Application No. 2019-008438 and is related to U.S. Appl. No. 16/743,154 ; with English language translation.

An Office Action; "Notice of Reasons for Refusal," mailed by the Japanese Patent Office dated Mar. 2, 2021, which corresponds to Japanese Patent Application No. 2019-008439 and is related to U.S. Appl. No. 16/743,154; with English language translation.

An Office Action issued by the United States Patent and Trademark Office dated Oct. 13, 2021, which corresponds to U.S. Appl. No. 16/743,154 and is related to U.S. Appl. No. 16/743,154.

A "Reconsideration Report by Examiner before Appeal", mailed by the Japanese Patent Office dated Feb. 22, 2022, which corresponds to Japanese Patent Application No. 2019-008438 and is related to U.S. Appl. No. 16/743,154 with English language translation.

An Office Action; "Notice of Reasons for Refusal", mailed by the Japanese Patent Office dated Mar. 15, 2022, which corresponds to Japanese Patent Application No. 2019-008439 and is related to U.S. Appl. No. 16/743,154 with English language translation.

An Office Action issued by the United States Patent and Trademark Office dated Apr. 20, 2022, which corresponds to U.S. Appl. No. 16/743,154 and is related to U.S. Appl. No. 16/743,154.

* cited by examiner

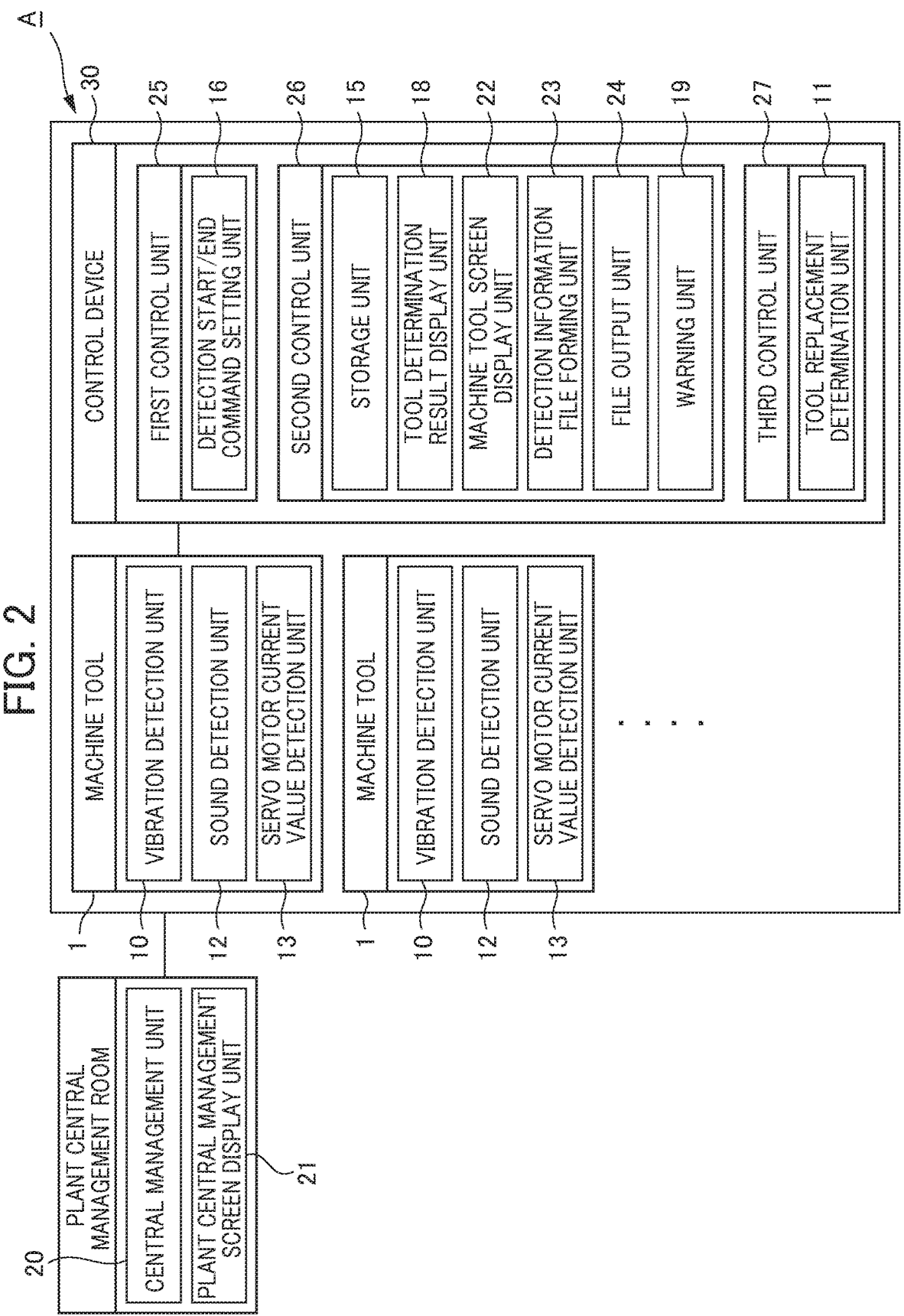

TOOL MANAGEMENT SYSTEM OF MACHINE TOOL

This application is based on and claims the benefit of priority from Japanese Patent Application No. 2019-008438, filed on 22 Jan. 2019, the content of which is incorporated herein by reference.

BACKGROUND OF THE INVENTION

Field of the Invention

The present invention relates to a tool management system of a machine tool.

Related Art

Conventionally, a machine tool such as an NC lathe or a machining center numerically controls a moving amount, a moving velocity, and the like of a tool using a computerized numerical control (CNC) technology with the aid of a computer to repeat the same machining procedure and automate machining or the like of a complex shape to a high degree. Moreover, data created by CAD and CAM is fetched into a CNC lathe, and various pieces of data such as options, parameters, an NC program, a macro program, macro variables, a work origin offset, a tool offset, tool shape data, and tool management data are input and controlled to automate a machine tool from designing to manufacturing systematically.

Patent Document 1: Japanese Unexamined Patent Application, Publication No. 2018-103284

SUMMARY OF THE INVENTION

On the other hand, tools which are expendable products have service lifetimes set unique to respective tool types and are replaced when the sum of machining times reaches a set time.

However, an appropriate service lifetime is determined comprehensively according to a plurality of factors such as a "tool type", a "machining target shape", a "machine target quality", and "machining conditions", and it is originally difficult to determine the appropriate service lifetime uniformly.

In contrast, although methods of checking and estimating a wear state, a machining accuracy, or the like of a tool for each machine tool to determine the time to replace the tool have been proposed and put into practical use (for example, see Patent Document 1), since the determined service lifetime changes depending on the type of a machined product and the proportion of the types, it is necessary to review the determined service lifetime appropriately. Therefore, it is strongly desirable to provide a method for determining an appropriate time to replace tools.

The present invention has been made in view of the above-described problems, and an object thereof is to provide a tool management system of a machine tool capable of determining an appropriate time to replace a tool used by a machine tool.

The present inventor found means capable of determining an appropriate time to replace a tool used by a machine tool and accomplished the present invention.

(1) The present invention is characterized in that it includes: at least one detection unit among: a vibration detection unit (for example, a vibration detection unit 10 to be described later) attached to a spindle (for example, a spindle 2 to be described later) that supports a tool (for example, a tool 3 to be described later) of a machine tool (for example, a machine tool 1 to be described later) to detect vibration; a sound detection unit (for example, a sound detection unit 12 to be described later) provided in the vicinity of the spindle to detect acoustic waves produced during operation of the machine tool; and a servo motor current value detection unit (for example, a servo motor current value detection unit 13 to be described later) that detects a current value of a servo motor (for example, a servo motor 4 to be described later) of a driving device (for example, a driving device 6 to be described later) of the machine tool; a tool replacement determination unit (for example, a tool replacement determination unit 11 to be described later) that determines the necessity to replace the tool on the basis of information related to a detection value of at least one of the vibration detected by the vibration detection unit, the acoustic waves detected by the sound detection unit, and the current value detected by the servo motor current value detection unit during operation of the machine tool; and a detection start/end command setting unit (for example, a detection start/end command setting unit 16 to be described later) that adds commands for a detection start point and a detection end point of at least one of the vibration, the acoustic waves, and the current value of the servo motor to a machining program.

(2) In the present invention of (1) described above, M codes for setting the commands for the detection start point and the detection end point of at least one of the vibration, the acoustic waves, and the current value of the servo motor may be provided in the machining program, and the detection start/end command setting unit may set the detection start point and the detection end point according to the set commands of the M codes which are auxiliary functions for performing machining.

(3) The present invention of (1) or (2) described above may further include: a tool determination result display unit (for example, a tool determination result display unit 18 to be described later) that displays comparison results between at least one of the vibration, the acoustic waves, and the current value of the servo motor detected during operation of the machine tool and the threshold set in advance by applying the comparison results to a tool list; and a warning unit (for example, a warning unit 19 to be described later) that issues a warning when it is determined that replacement of the tool is necessary.

(4) In the present invention of any one of (1) to (3) described above, a plurality of machine tools may be provided in a plant, and the present invention may include: a plant central management screen display unit (for example, a plant central management screen display unit 21 to be described later) that shows the machine tool having the tool which needs replacement on a plant central management screen when the tool replacement determination unit determines that replacement of the tool is necessary; and a machine tool screen display unit (for example, a machine tool screen display unit 22 to be described later) provided in the machine tool having the tool which needs replacement to indicate that replacement of the tool is necessary.

(5) The present invention of any one of (1) to (4) described above may further include: a detection information file forming unit (for example, a detection information file forming unit 23 to be described later) that creates files that associate detection results of at least one of the vibration, the acoustic waves, and the current value of the servo motor with tool data and machining information; and a file output unit (for example, a file output unit 24 to be described later) that outputs the files created by the detection information file forming unit to an external device.

According to the present invention, it is possible to determine an appropriate time to replace a tool used by a machine tool.

BRIEF DESCRIPTION OF THE DRAWINGS

FIG. 2 is a block diagram illustrating a tool management system of a machine tool according to an embodiment of the present invention.

DETAILED DESCRIPTION OF THE INVENTION

Figure 1:
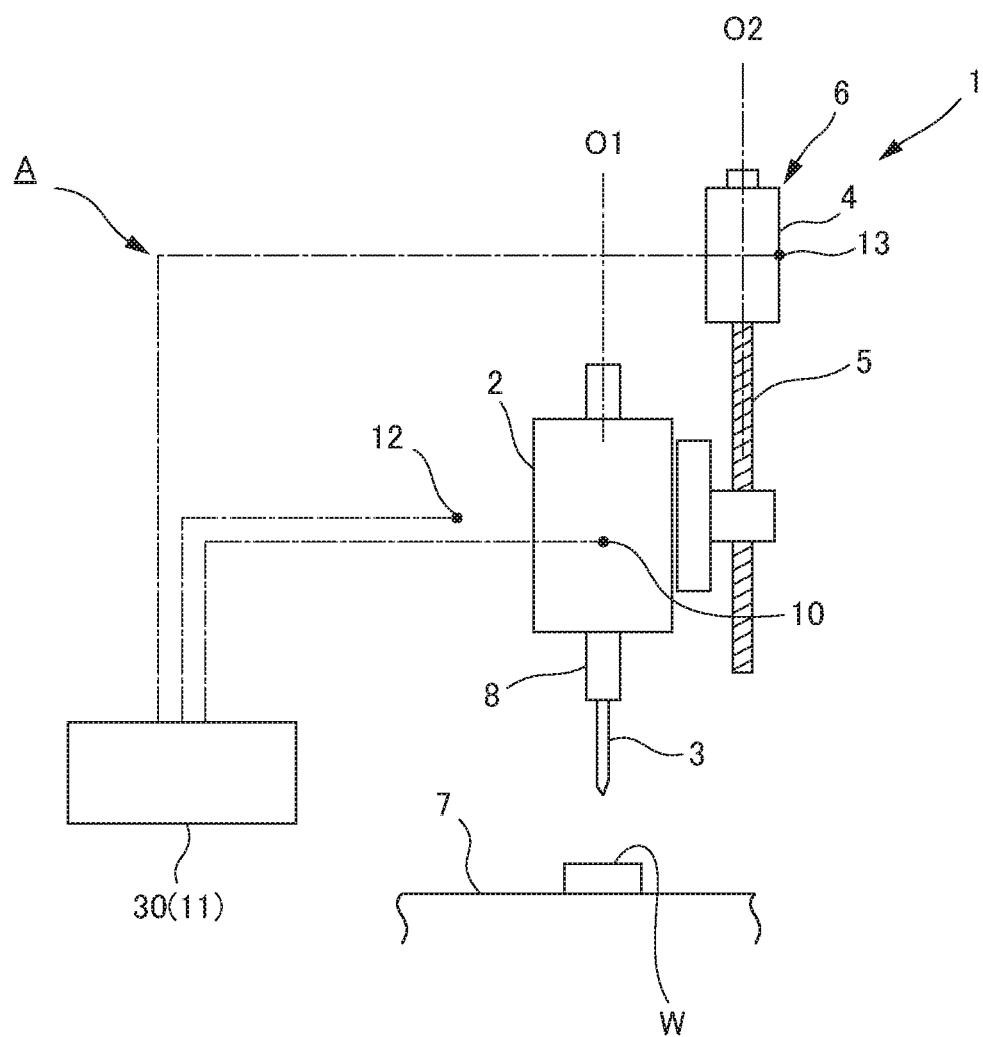
FIG. 1 is a diagram illustrating a machine tool and a tool management system of a machine tool according to an embodiment of the present invention.

Hereinafter, a tool management system of a machine tool according to an embodiment of the present invention will be described with reference to FIGS. 1 and 2.

Here, the present invention relates to a tool management system of a machine tool capable of determining an appropriate time to replace a tool used by a machine tool.

Specifically, first, a machine tool 1 according to the present embodiment is a machine tool such as an NC lathe or a machining center, and as illustrated in FIG. 1, includes, for example, a spindle 2 arranged to face an axial line O1 in an up-down direction, a rotation driving unit (a spindle motor: not shown) for rotating the spindle 2 around the axial line O1, a tool 3 attached to the spindle 2, a driving device 6 that rotates a feed axis 5 around an axial line O2 extending in an up-down direction in a normal direction and a reverse direction and allows the spindle 2 so as to advance and retract in an up-down direction with the aid of a servo motor 4 to thereby position the spindle 2 and the tool 3, a table 7 disposed under the spindle 2 and the tool 3 to fix and support a machining target work W on an upper surface thereof and so as to be movable in relation to the spindle 2 and the tool 3 in an up-down direction (Z) and a front-rear direction (horizontal directions of front, rear, left, and right directions: XY), and a tool management system A of the machine tool.

The tool 3 is detachably connected to the spindle 2 with a holder 8 disposed therebetween in a state in which the axial lines O1 thereof are on the same axis. In the present embodiment, although the spindle 2 rotates around the axial line O1, there is no limitation thereto. For example, the machine tool 1 may include an approximately cylindrical spindle arranged to face the axial line O1 in an up-down direction, a rotary axis supported inside the spindle with a bearing disposed therebetween so as to be rotatable around the axial line O1, and a rotation driving unit for rotating the rotary axis, the tool 3 is detachably connected to the rotary axis with the holder 8 disposed therebetween, and the tool 3 is attached to the spindle.

On the other hand, as illustrated in FIGS. 1 and 2, the tool management system A of the machine tool according to the present embodiment includes: a vibration detection unit (a vibration sensor: a detection unit) 10 attached to the spindle 2 that supports the tool 3 and a tool replacement determination unit 11 that compares the vibration detected by the vibration detection unit 10 during operation of the machine tool 1 with a threshold (a reference value) of vibration set in advance to determine the necessity (a life, a wear state, and a deterioration state) to replace the tool 3.

The tool management system A of the machine tool further includes a sound detection unit (an acoustic sensor: a detection unit) 12 provided in the vicinity of the spindle 2 to detect acoustic waves (sound) produced when a machining target work W is machined by the tool 3. The tool replacement determination unit 11 compares the acoustic waves detected by the sound detection unit 12 during operation of the machine tool 1 with a threshold (a reference value) of acoustic waves set in advance to determine the necessity to replace the tool 3.

The tool management system A of the machine tool further includes a servo motor current value detection unit (a detection unit) 13 that detects a current value of the servo motor 4. The tool replacement determination unit 11 compares the current value detected by the servo motor current value detection unit 13 during operation of the machine tool 1 with a threshold (a reference value) of a current value set in advance to determine the necessity to replace the tool 3.

The tool management system A of the machine tool includes a storage unit 15 that stores the detected vibration, acoustic waves, and current value and stores the thresholds of the vibration, acoustic waves, and current value.

That is, in the tool management system A of the machine tool according to the present embodiment, the tool replacement determination unit 11 determines the necessity to replace the tool 3 on the basis of the vibration, the acoustic waves, and the current value detected during operation of the machine tool 1 by the vibration detection unit 10, the sound detection unit 12, and the servo motor current value detection unit 13 and the information data such as the thresholds stored in the storage unit 15.

In the present invention, the tool management system A of the machine tool may include at least one of the vibration detection unit 10, the sound detection unit 12, and the servo motor current value detection unit 13, and the tool replacement determination unit 11 may determine the necessity to replace the tool 3. Moreover, the expression "the vicinity of the spindle 2" in the present invention indicates a region around the spindle 2 in which acoustic waves can be detected by the sound detection unit 12 and the necessity to replace the tool 3 can be determined on the basis of the detected acoustic waves.

The tool management system A of the machine tool according to the present embodiment includes: a detection start/end command setting unit 16 for adding commands (for setting commands) for a detection start point and a detection end point of at least one of vibration, acoustic waves, and a current value of a servo motor to a machining program, a tool determination result display unit 18 that displays a comparison result between at least one of the vibration, the acoustic waves, and the current value of the servo motor detected during operation of the machine tool 1 and the threshold set in advance by applying the comparison result to a tool list stored in a storage unit 15, and a warning unit 19 that issues a warning when it is determined that it is necessary to replace the tool 3.

In the present embodiment, M codes for setting commands for a detection start point and a detection end point of at least one of vibration, acoustic waves, and a current value of a servo motor are provided in M codes which are auxiliary functions for performing machining, for example.

When M codes for setting commands for a detection start point and a detection end point of at least one of vibration, acoustic waves, and a current value of a servo motor are selected, the detection start/end command setting unit 16 adds a detection start point and a detection end point to a machining program according to the set commands of the M codes.

By using M codes as means for setting the commands for the detection start point and the detection end point and using macros (variables, computation commands, conditional branching, and the like) appropriately in combination, an operator can freely start and end measurement during a machining program and can automatically measure at least one of the vibration, the acoustic waves, and the current value of the servo motor when performing machining using a machining program in which it is desired to perform measurement.

That is, by using M codes which have been used in a numerical control field of machine tools, for example, as means for setting the commands for a detection start point and a detection end point, it is possible to easily apply the M codes to a machining program.

In a tool management system of a machine tool according to the present invention, the means for setting the commands for a detection start point and a detection end point is not necessarily limited to the M code. For example, the commands for a detection start point and a detection end point may be set using macro functions (macro variables and the like). Moreover, M codes and macro functions may be used together. That is, macro variables for measurement other than M codes may be prepared so that a macro variable #000=1 corresponds to start of detection and a macro variable #000=0 corresponds to end of detection. Such a program may be used as a subprogram so that the subprogram can be called. However, when methods other than M codes are used, it may be necessary to prepare logics individually and a lot of labor is required for creating a program. Moreover, readability may decrease.

In the present embodiment, a plurality of machine tools 1 are provided in a plant, and the plurality of machine tools 1 are managed centrally by a central management unit 20 of a central management room. The tool management system A of the machine tool includes a plant central management screen display unit 21 that shows a machine tool 1 having the tool 3 which is determined to need replacement by the tool replacement determination unit 11 on a plant central management screen, and a machine tool screen display unit 22 provided in the machine tool 1 having the tool 3 which needs replacement to indicate that replacement of the tool 3 is necessary.

The tool management system A of the machine tool includes a detection information file forming unit 23 that creates files that associate a detection result of at least one of the vibration, the acoustic waves, and the current value of the servo motor with the tool data and the machining information stored in the storage unit 15, and a file output unit 24 that outputs the files created by the detection information file forming unit 23 to an external device. The external device to which the files are output is a plant central management room, a machine tool, or the like, for example.

Here, the machine tool 1 of the present embodiment includes a control device (a control system) 30 including a first control unit (for example, a numerical controller (CNC)) 25 for controlling a machine tool body (the machine tool), a second control unit (for example, PMC) 26 that outputs signals to an auxiliary device (for example, the automatic tool changer or the like) of the machine tool body via an I/O unit to perform control according to a sequence program included in the numerical controller, and a third control unit (an external controller) 27 that determines whether it is necessary to change the tool 3 on the basis of the vibration, the acoustic waves, and the current value detected during operation of the machine tool 1 by the vibration detection unit 10, the sound detection unit 12, and the servo motor current value detection unit 13.

In the tool management system A of the machine tool of the present embodiment, the detection start/end command setting unit 16 is provided in the first control unit 25, for example. The tool determination result display unit 18, the warning unit 19, the machine tool screen display unit 22, the detection information file forming unit 23, the file output unit 24, and the storage unit 15 that stores the vibration, the acoustic waves, and the current value and the thresholds of the vibration, the acoustic waves, and the current value are provided in the second control unit 26. The tool replacement determination unit 11 is provided in the third control unit 27. The control device 30 may not necessarily include the first control unit 25, the second control unit 26, and the third control unit 27 individually. The means (units) provided in the control units 25, 26, and 27 are not limited to the above.

In the tool management system A of the machine tool according to the present embodiment having the above-described configuration, an operator or the like sets an M code of the detection start point and an M code of the detection end point of the vibration, the acoustic waves, and the current value of the servo motor, of the machining program with the aid of the detection start/end command setting unit 16 of the first control unit 25.

The set commands for the M code of the detection start point and the M code of the detection end point are sent to the second control unit 26, and the second control unit 26 specifies and extracts information such as a machine number, a program number, a sequence number, a tool number (a tool list), and the spindle 2, information on vibration, acoustic waves, and a current value corresponding to the information, and reference data such as files that tool data created in the past and machining information with vibration, acoustic waves, and a current value from the storage unit 15, allows the tool replacement determination unit 11 of the third control unit 27 to acquire (for example, by downloading) these pieces of information, and sets a measurement start flag. In this way, detection and measurement of vibration, acoustic waves, and a current value by the vibration detection unit 10, the sound detection unit 12, and the servo motor current value detection unit 13 start.

In this case, the tool replacement determination unit 11 of the third control unit 27 can acquire these pieces of information. When measurement can be started, the third control unit 27 notifies the second control unit 26 of this and an OK flag is set. When download or the like is not completed properly and measurement cannot be started, the third control unit 27 notifies the second control unit 26 of this and an NG flag is set. In this way, in a stage in which an OK flag is confirmed by the second control unit 26, the first control unit 25 starts machining. When an NG flag is set by the second control unit 26, the warning unit 19 issues a warning (an alarm) such as displaying a PMC alarm and turning on a warning light so that an operator recognizes this.

On the other hand, during operation of the machine tool 1, measurement data (input data) of the vibration, the acoustic waves, and the current value of the servo motor measured by the vibration detection unit 10, the sound detection unit 12, and the servo motor current value detection unit 13 is compared with reference data (a threshold or a reference value) by the tool replacement determination unit 11 of the third control unit 27. When the measurement data exceeds a threshold, it is determined that there is an abnormality in the tool 3, and a determination result is sent to the second control unit 26 and the first control unit 25.

Furthermore, operation of the machine tool 1 is stopped, and the warning unit 19 issues a warning such as displaying a PMC alarm and turning on a warning light and allows an operator or the like to recognize an abnormality in the tool 3.

When the measurement data does not exceed the threshold and a detection end point is reached, a notification of the end of measurement is issued from the first control unit 25 to the second control unit 26, and an OK flag and an NG flag are removed.

When an abnormality in the tool 3 has occurred and a detection end point has been reached without exceeding a threshold, in a state in which measurement ends, the files that associate detection results of the vibration, the acoustic waves, and the current value of the servo motor with tool data and machining information and tool files are created (including overwriting) by the detection information file forming unit 23 and are stored in the storage unit 15. In the present embodiment, the files created by the detection information file forming unit 23 are output to an external device.

When the tool replacement determination unit 11 determines that replacement of the tool 3 is necessary, the plant central management screen display unit 21 shows the machine tool 1 having the tool 3 which needs replacement on the plant central management screen. Moreover, the machine tool screen display unit 22 of the second control unit 26 shows that replacement of the tool 3 is necessary on the tool 1 having the tool 3 which needs replacement.

Therefore, in the tool management system A of the machine tool according to the present embodiment, it is possible to determine an appropriate time to replace a tool used by the machine tool 1 on the basis of a detection result of at least one of vibration, acoustic waves, and a current value of a servo motor.

Moreover, it is possible to detect an abnormality in the tool 3 with high accuracy and determine the time to replace the tool 3 used by the machine tool 1 more accurately by appropriately combining the three detection factors including vibration, acoustic waves, and a current value of a servo motor.

Here, when there is an abnormality in the work W or the mechanism of the machine tool 1, for example, as well as when there is an abnormality in the tool 3, the vibration, the acoustic waves, and the current value detected by the vibration detection unit 10, the sound detection unit 12, and the servo motor current value detection unit 13 during operation of the machine tool 1 may exceed the thresholds.

In contrast, in the tool management system A of the machine tool according to the present embodiment, rather than simply detecting the vibration, the acoustic wave, and the current value of the servo motor and estimating and predicting the presence of an abnormality on the basis of the detection values, when a detection value exceeds a threshold, the measurement data of the detected vibration, acoustic waves, and current value is compared with the data when there is an abnormality in the work W or the mechanism of the machine tool 1 on the basis of the information stored in the storage unit 15 when there is an abnormality in the work W or the mechanism, it is specified that the measurement data corresponds to a vibration waveform, an acoustic waveform, and a current value waveform when there is an abnormality in the tool 3, and the tool replacement determination unit 11 determines the necessity to replace the tool 3. In this way, it is possible to determine an appropriate time to replace the tool 3 with high accuracy.

In the tool management system A of the machine tool according to the present embodiment, since the detection start/end command setting unit 16 can add commands for a detection start point and a detection end point to the machining program, it is possible to determine the necessity to replace the tool 3 at an appropriate timing during operation of the machine tool 1. Specifically, for example, since the detection start/end command setting unit 16 can add commands for a detection start point and a detection end point to the machining program, it is possible to start measurement at a machining start position of an arbitrary machining path which is likely to be affected from wearing of a tool such as rigidity of the work W or the structure of a jig and to end measurement at a machining end position. In this way, it is possible to reduce machining defects resulting from wearing of a tool. Moreover, since data can be acquired in necessary positions only, it is possible to make determination accurately. That is, it is possible to make determination with high reliability.

In the tool management system A of the machine tool according to the present embodiment, the commands for a detection start point and a detection end point of vibration, acoustic waves, and a current value are set using M codes (macro variables or the like). In this way, an operator can freely set the start and the end of measurement in a machining program. Moreover, when machining is performed using a machining program in which it is desired to perform measurement, measurement can be performed automatically. Furthermore, it is possible to easily apply the M codes to a program, it is not necessary to prepare logics individually, it will not be difficult to create a program, and it is possible to maintain and secure readability suitably.

In the tool management system A of the machine tool according to the present embodiment, the tool determination result display unit 18 can display the results of comparison between the vibration, the acoustic waves, and the current value of the servo motor detected during operation of the machine tool 1 and predetermined thresholds by applying the results to a tool list. The warning unit 19 can allow an operator or the like to reliably recognize that replacement of the tool 3 is necessary. Moreover, an operator or the like can determine in advance the degree of deterioration of the tool 3 and whether it is likely that a threshold is exceeded when the tool 3 is used in subsequent machining by checking the tool list.

The plant central management screen display unit 21 can show a machine tool 1 having the tool 3 which needs replacement on the plant central management screen when the tool replacement determination unit 11 determines that replacement of the tool 3 is necessary. The machine tool screen display unit 22 can show that replacement of the tool 3 is necessary on the machine tool 1 having the tool 3 which needs replacement. In this way, it is possible to perform management of tools efficiently and effectively by checking the files.

The detection information file forming unit 23 can create files that associate the detection results of vibration, acoustic waves, and a current value of a servo motor with tool data and machining information. The file output unit 24 can output the files created by the detection information file forming unit 23 to an external device. In this way, an operator or the like can determine in advance the degree of deterioration of the tool 3 and whether it is likely that a threshold is exceeded when the tool 3 is used in subsequent machining and can perform tool management efficiently and effectively.

Therefore, according to the tool management system A of the machine tool of the present embodiment, it is possible to automatically determine an appropriate time to replace the tool 3 used by the machine tool 1 and to suppress occurrence of defective products and improve productivity efficiently and effectively.

While an embodiment of the tool management system of the machine tool according to the present invention has been described, the present invention is not limited to the embodiment but can be changed appropriately without departing from the spirit thereof.

EXPLANATION OF REFERENCE NUMERALS

1: Machine tool
2: Spindle
3: Tool
4: Servo motor
5: Feed axis
6: Driving device
10: Vibration detection unit (Detection unit)
11: Tool replacement determination unit
12: Sound detection unit (Detection unit)
13: Servo motor current value detection unit (Detection unit)
15: Storage unit
16: Detection start/end command setting unit
18: Tool determination result display unit
19: Warning unit
20: Central management unit
21: Plant central management screen display unit
22: Machine tool screen display unit
23: Detection information file forming unit
24: File output unit
25: First control unit
26: Second control unit
27: Third control unit
30: Control device (Control system)
A: Tool management system of machine tool
W: Work

What is claimed is:

1. A tool management system of a machine tool, comprising:
   a controller;
   at least two detection units among:
      a vibration sensor attached to a spindle that supports a tool of the machine tool to detect vibration;
      a sound sensor provided in the vicinity of the spindle to detect acoustic waves produced during operation of the machine tool; and
      a servo motor current value detection unit to detect a current value of a servo motor of a driving device of the machine tool;
   a tool replacement determination unit, to be executed by the controller, to determine the necessity to replace the tool when detection values of the at least two detection units exceed corresponding thresholds during operation of the machine tool; and
   a detection start/end command setting unit, to be executed by the controller, to add commands for a detection start point and a detection end point of at least one of the vibration, the acoustic waves, and the current value of the servo motor to a machining program, the detection start point being a machining start position and the detection end point being a machining end position,
   wherein the detection start/end command setting unit sends the commands for the detection start point and the detection end point to a control unit, and
   the control unit sets a measurement start flag to start the detection by the at least two detection units when the tool replacement determination unit is ready to acquire information from the control unit.

2. The tool management system of the machine tool according to claim 1, wherein
   M codes for setting the commands for the detection start point and the detection end point of at least one of the vibration, the acoustic waves, and the current value of the servo motor are to be provided in the machining program, and
   the detection start/end command setting unit, to be executed by the controller, to set the detection start point and the detection end point according to the set commands of the M codes which are auxiliary functions for performing machining.

3. The tool management system of the machine tool according to claim 1, further comprising:
   a tool determination result display to display comparison results between at least one of the vibration, the acoustic waves, and the current value of the servo motor detected during operation of the machine tool and the threshold set in advance by applying the comparison results to a tool list; and
   a warning unit to issue a warning when it is determined that replacement of the tool is necessary.

4. The tool management system of the machine tool according to claim 1, wherein
   a plurality of machine tools are provided in a plant, and the tool management system includes:
   a plant central management screen display unit to show the machine tool having the tool which needs replacement on a plant central management screen when the tool replacement determination unit determines that replacement of the tool is necessary; and
   a machine tool screen display unit provided in the machine tool having the tool which needs replacement to indicate that replacement of the tool is necessary.

5. The tool management system of the machine tool according to claim 1, further comprising:
   a detection information file forming unit, to be executed by the controller, to create files that associate detection results of at least one of the vibration, the acoustic waves, and the current value of the servo motor with tool data and machining information; and
   a file output unit, to be executed by the controller, to output the files created by the detection information file forming unit to an external device.

6. The tool management system of the machine tool according to claim 1, wherein the tool replacement determination unit compares the detection value with at least one of abnormal data of a workpiece and abnormal data of the machine tool when the detection value exceeds a threshold.

* * * * *